United States Patent [19]

Tani et al.

[11] Patent Number: 5,151,974
[45] Date of Patent: Sep. 29, 1992

[54] DATA DISPLAY METHOD

[75] Inventors: Masayuki Tani; Kunio Nakanishi; Atsushi Kawabata; Norito Watanabe, all of Hitachi; Takanori Yokoyama, Hitachioota; Shinya Tanifuji, Hitachi, all of Japan

[73] Assignee: Hitachi, Ltd., Tokyo, Japan

[21] Appl. No.: 79,046

[22] Filed: Jul. 29, 1987

[30] Foreign Application Priority Data

Jul. 31, 1986 [JP] Japan ............... 61-178659

[51] Int. Cl.⁵ .............................. G06F 3/153
[52] U.S. Cl. .................... 395/128; 395/157; 340/724; 340/723
[58] Field of Search ........... 364/521, 522, 523, 518, 364/490, 491, 927.3, 927.4; 340/747, 750, 799, 798, 724, 731; 382/86; 395/128, 157

[56] References Cited

U.S. PATENT DOCUMENTS

| | | | |
|---|---|---|---|
| 4,550,315 | 10/1985 | Bass et al. | 340/703 |
| 4,574,364 | 3/1986 | Tabata et al. | 364/900 |
| 4,642,790 | 2/1987 | Minshull et al. | 364/900 |
| 4,660,157 | 11/1987 | Beckwith et al. | 364/522 |
| 4,672,683 | 6/1987 | Matsueda | 382/57 |
| 4,688,181 | 8/1987 | Cottrell et al. | 364/521 |
| 4,700,320 | 10/1987 | Kapur | 364/521 |
| 4,716,404 | 12/1987 | Tabata et al. | 340/723 |
| 4,729,029 | 3/1988 | Henri et al. | 358/183 |
| 4,737,916 | 4/1988 | Ogawa et al. | 364/443 |
| 4,751,507 | 6/1988 | Hama et al. | 340/724 |
| 4,758,953 | 7/1988 | Morita et al. | 364/300 |
| 4,766,555 | 8/1988 | Bennett | 364/518 |
| 4,823,278 | 4/1989 | Kikuchi et al. | 364/491 |
| 4,831,543 | 5/1989 | Mastellone | 364/489 |
| 4,847,788 | 7/1989 | Shimada | 364/522 |
| 4,910,785 | 3/1990 | Nakatsuma | 382/9 |
| 4,974,175 | 11/1990 | Suzuki et al. | 364/522 |
| 5,001,697 | 3/1991 | Torres | 364/521 |

OTHER PUBLICATIONS

Shectman et al. "The Electronics Engineer's Design Station" IEEE CG 9A Apr. 1981 pp. 15-23.
Bruggere et al. "Tools for Computer-Aided Engineering" IEEE CG 9A Dec. 1983 pp. 48-53.

Primary Examiner—Gary V. Harkcom
Assistant Examiner—Phu K. Nguyen
Attorney, Agent, or Firm—Antonelli, Terry, Stout & Kraus

[57] ABSTRACT

In a graphic data processing system of a CAD system for the design of an LSI, there is provided a display screen, a storage in which graphic data structured in the hierarchy of three levels, i.e. a functional block diagram level, a logical symbol level and a circuit component level, and a pointing device for designating a window within the display screen. The display method of the present invention is characterized in that the size of a designated window is judged and the graphic data of the concept level corresponding to the judged size of the window is read out and displayed within the window.

15 Claims, 3 Drawing Sheets ( SMALL WINDOW )

( MEDIUM WINDOW )

( LARGE WINDOW )

WORLD COORDINATES

DEVICE COORDINATES
(DISPLAY SCREEN)

DATA DISPLAY METHOD

BACKGROUND OF THE INVENTION

1. Field of The Invention

The present invention relates to a data display method in a graphic data processing system which has display data structured in the hierarchy of plural concept levels, especially to an improved method capable of displaying a drawing of the different concept levels selected in response to a window designated in a display screen.

2. Description of The Related Art

Generally a display screen, for example, in a computer aided design (CAD) system for the design of large scale integration circuits (LSI), has a limitation in the screen size available for display and therefore can not display a general drawing showing the whole structure of a LSI on a convenient scale for the design work.

Conventionally, to overcome this problem, there has been defined a window within the display screen. A drawing of a part of the LSI which is now being designed has been displayed in a main area of the display screen on a convenient scale, while, in the area of the window, a general drawing of the whole structure of the LSI has been displayed on a reduced scale in order to make sure of what part of the whole structure is now being worked on. A method and apparatus of this kind is disclosed in pp. 169 to 173 of the journal "PIXEL" No.14, 1983, for example.

By the way, the general drawing does not need to be referred to so often during the design work. Therefore, a window defined within the display screen is preferred to be variable in its size, whereby a part which is now being designed can be displayed on the convenient scale by reducing the size of the window, in case the present size of the window impedes the design work. In such a case, however, the rate of scale-down of the general drawing is often changed and becomes very large depending on circumstances. If the rate of scale-down becomes large to a certain extent, characters in a displayed drawing are defaced or pairs of lines therein become undistinguishable, so that the displayed drawing becomes very indistinct as a whole.

It is to be noted that, even in this case, the amount of data to be processed for the display does not change, and nevertheless the quality of the displayed graphic is degraded. The problem mentioned above results from the fact that the amount of data to be displayed does not change irrespective of decrease of the size of the designated window. Conversely, a certain amount of data is processed for the uninformative display. Accordingly the efficiency of the processing considerably decreases.

SUMMARY OF THE INVENTION

An object of the present invention is to provide a data display method in a graphic data processing system which is capable of distinctly displaying a drawing based on graphic data structured in the hierarchy of plural concept levels and of improving the efficiency of the processing.

A feature of the present invention is that, in a data display method in a graphic data processing system having a display screen, a storage in which graphic data is stored and a pointing device for designating a window of a given size at a desired position within the display screen, the size of the window designated by the pointing device is judged, and graphic data of a different concept level in response to the result of the above judgement is selected from among the graphic data stored in the storage and displayed within the designated window.

The size of the window, as mentioned above, is only an example of parameters for the judgement in selecting the concept level of the data to be displayed. As such a parameter indicating the feature or characteristic of the designated window, there can be also used the rate of scale-up and -down of the graphic data to be displayed within the designated window in the coordinate transformation carried for displaying of the graphic data stored in the storage, in place of the window size mentioned above. More particularly, the method according to the present invention is characterized by storing the graphic data structured in the hierarchy of plural concept levels in the storage, setting in advance criteria for judging a parameter of a window, each of the judging criteria being made to correspond to a particular one of the concept levels of the graphic data stored in the storage, designating a window, judging to what criterion of the parameter the designated window belongs, selecting the graphic data of the concept level corresponding to the criterion of the parameter, to which the designated window belongs, from among the graphic data stored in the storage, and displaying the selected graphic data within the designated window.

In a CAD system for the design of LSI, for example, a storage stores graphic data structured in the hierarchy of plural concept levels, e.g. data for the highest concept level such as the functional block diagram level, data for the medium concept level such as the logical symbol arrangement level and data for the lowest concept level such as the circuit component arrangement level. One of the graphic data of the different concept level is selected in response to the predetermined parameter of a designated window, such as the size thereof or the rate of scale-up and -down of the graphic data to be displayed within the designated window, and displayed in the window. If, therefore, a small size of a window is designated, for example, the graphic data of the highest concept level is selected and displayed. As a result, the minimum necessary information can be given to a user in the distinct form.

DESCRIPTION OF THE PREFERRED EMBODIMENTS

Figure 1A:
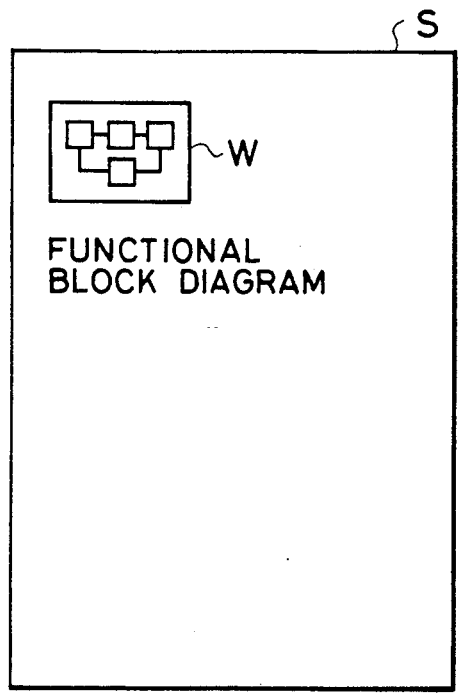
FIGS. 1a to 1c show examples of a data display according to an embodiment of the present invention, in which there is indicated the relationship between the size of a window and the concept level of a drawing to be displayed in the window.
Figure 1B:
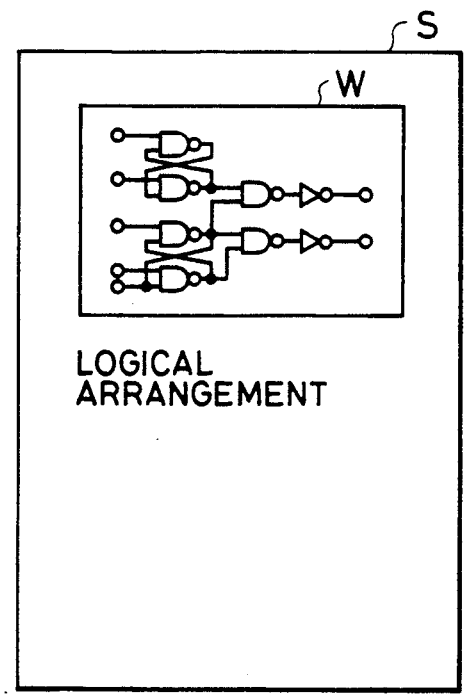
Figure 1C:
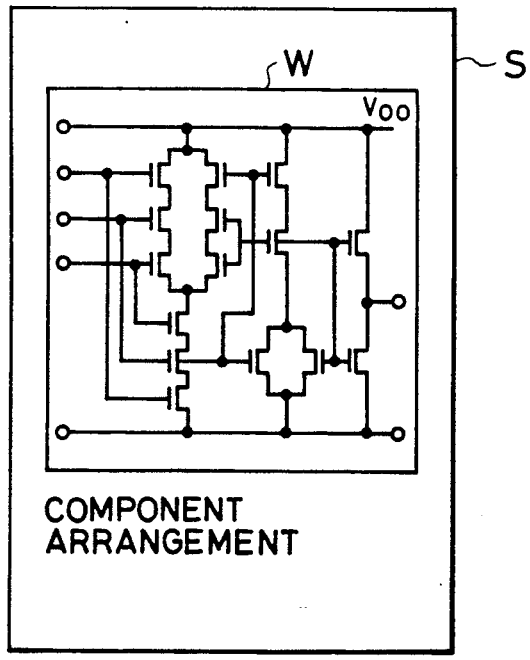

Referring at first to FIGS. 1a to 1c, there will be described the relationship between the size of a window W designated within a display screen S and the concept level of a graphic data to be displayed in the window W, taking a data display in a CAD system for the design of LSI as an example.

FIG. 1a shows the case where a small size of the window W is designated. In this case, since the size of the window area is small, the graphic data of the highest concept level is selected for the display; a functional block diagram of an LSI in this example. In the remaining area of the display screen S, a part of the LSI, which is now being designed, is displayed. Accordingly, a designer can carry out his design work on the display screen S, while referring to the general drawing of the whole structure of LSI displayed within the window W. Thereby, the designer can have the general idea of the relationship of a part, which is now being designed by him, to the whole structure.

If the medium size of the window W is designated as shown in FIG. 1b, the graphic data of the medium concept level is selected and displayed within the designated window. The graphic data of the medium concept level in this example is data for the arrangement of logical symbols. In this case, the designer can be given the more detailed information of the whole structure of the LSI. As shown in FIG. 1c, if the further large size of the window W is allowed to be designated, there can be displayed in the designated window the most detailed drawing of the whole structure which is of the lowest concept level and is drawn by primitive circuit components.

In this manner, according to the present invention, there is stored in an appropriate storage the graphic data of various concept levels, and the concept level of the graphic data to be displayed within the window is determined in response to a certain parameter of the window, i.e., the size of the window in the example shown. For example, if the circuit component arrangement as shown in FIG. 1c were displayed within the window of the size as shown in FIG. 1a by reducing the scale of the drawing of the component arrangement, the designer could no longer read the exact information of the whole structure from the display in the window, since such a drawing displayed has the considerably large rate of scale-down and is very indistinct.

Figure 2:
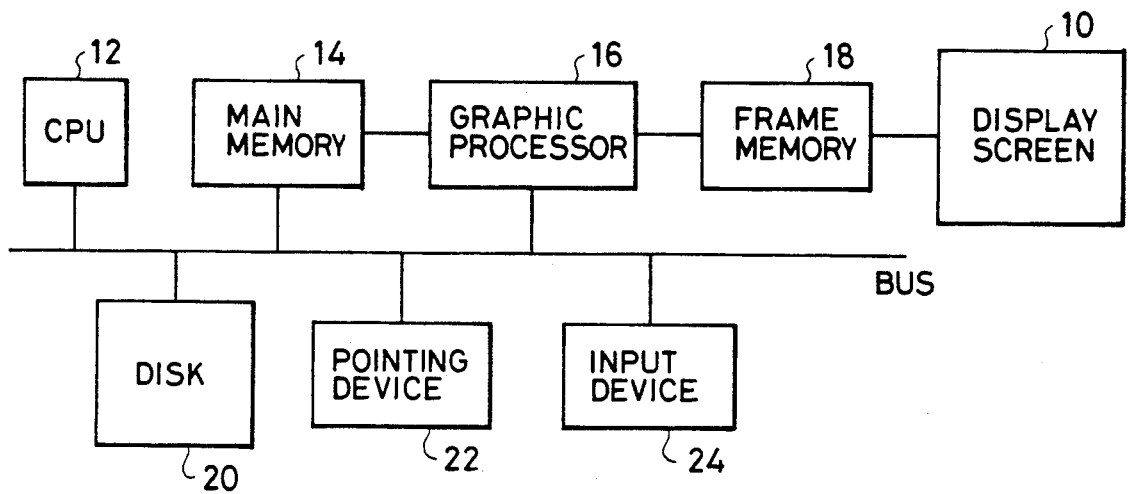
FIG. 2 is a block diagram schematically showing an apparatus for executing the data display method according to the present invention.

Referring next to FIG. 2, the description will be made of an apparatus for carrying out the method according to the present invention. Such an apparatus is generally known as a work station. The work station has a display screen 10, a central processing unit (CPU) 12, a main memory 14, a graphic processor 16, a frame memory 18, a disk memory 20, a pointing device 22 for designating a window, and an input device 24. Thereamong, CPU 12, the main memory 14, the graphic processor 16, the disk memory 20, the pointing device 22 and the input device 24 are connected to each other through a bus. The display screen 10 is connected to the graphic processor 16 through the frame memory 18. Since the configuration shown is that of a usual work station and respective components thereof as described above are all known, the further detailed description thereof will be omitted.

When the design of a new LSI is carried out at this work station, a designer usually starts the design of the functional concept by using appropriate function and resources for the design work which are the same as ones provided in a usual work station. This design work is carried out within the memory space of the main memory 14 by the aid of CPU 12. Therefore, when the functional block diagram is completed, all the graphic data thereof is stored in the main memory 14, and thereafter the data of the main memory 14 is transferred to and stored in the disk memory 20.

After that, the designer enters into the design of the logical arrangement, whereby data for the arrangement of logical symbols is formed and stored in the disk memory 20. During the design of the logical arrangement, the designer can designate a window of the desired size at the desired position within the display screen 10 by using the pointing device 22, and the data of the functional block diagram is read out from the disk memory 20 and displayed within the designated window. Therefore, the designer can refer to the window during the design work and have a general idea of the relationship of a part, which is now being designed by him, to the whole structure.

After the completion of the logical arrangement, the designer sets about the design of the circuit component arrangement. Also in the course of this design work, the designer can designate a window of the desired size at the desired position within the display screen 10 by the pointing device 22 and display a graphic data read out from the disk memory 20. The graphic data displayed at this time can be either one of data for the functional block diagram or that for the logical arrangement in response to the size of the window designated by the designer. Also, data of the circuit component arrangement obtained with the completion of the design of the circuit component arrangement is stored in the disk memory 20.

In this manner, the graphic data structured in the hierarchy of the plural concept levels are successively stored in the disk memory 20 with the progress of the design or the LSI, and when the design of the LSI has been completed, the graphic data for the design of the LSI is stored in the disk memory 20 for every hierarchical level.

Thereafter, when the design of the LSI is proofread or becomes necessary to be changed, the graphic data stored in the disk memory 20 is corrected or edited. At that time, data of the necessary concept level is transferred from the disk memory 20 to the main memory 14. The designer carries out the processing such as the correction or edition of data transferred in the main memory 14 by the aid of CPU 12, referring to a drawing displayed on the display screen 10. The processed data is transferred to and stored in the disk memory 20 again.

Also during this correction or edition, it is possible to designate a desired window and display a general drawing therein thereby to make sure of the relationship of a part, which is now being designed, to the general drawing. In this case, it is of course evident that it is not always necessary to transfer data for the general drawing to the main memory 14, but it is sufficient to transfer one a necessary part of the data thereof to the main memory 14 as it is needed.

Further, when data is transferred from the disk memory 20 to the main memory 14 and vice versa, the data can be subject to some processing by CPU 12. For example, data is stored in the main memory 14 in the data form by which CPU 12 and the graphic processor 16 can easily refer to it, and when data in the main memory 14 is transferred to the disk memory 12, it is converted into a data form by which data to be stored occupies as small a storage space of the disk memory 20 as possible.

Next the description will be made of the processing in the display processor 16. The processor 16 begins executing instructions successively read out from the main memory 14, when it receives from CPU 12 a start command and an entrance address in the main memory 14, at which a starting instruction is stored. As the instructions for the graphic processor 16, there are instructions for drawing basic figures such as a line and an arc, instructions for block transfer or arithmetic operation between data in the main memory 14 and that in the frame memory 18, various kinds of control instructions such as "jump" and "end", and so on.

Each of the figure drawing instructions fetched in the graphic processor 16 has an operand which designates the location where a certain figure is to be drawn. The operand is given in the form of values in a coordinate system mentioned below. The coordinate system in which the operand is given is capable of existing irrespective of the arrangement of pixels on the display screen 10 and can be arbitrarily defined by a user of the work station (this is generally called a world coordinate system). Therefore, the user can assume a given coordinate system as a world coordinate system and make up a series of figure drawing instructions in the world coordinate system by the aid of CPU 12. The graphic processor 16 carries out the transformation of the thus formed figure drawing instructions from the world coordinate system to a coordinate system in which one point of the coordinates physically corresponds to one pixel of the display screen 10 (the latter is generally called a device coordinate system). In this sense, the coordinate transformation carried by the graphic processor 16 can be said to be a transformation for display of the graphic data stored in the main memory 14 (or the disk memory 20) on the display screen 10.

Figure 3:
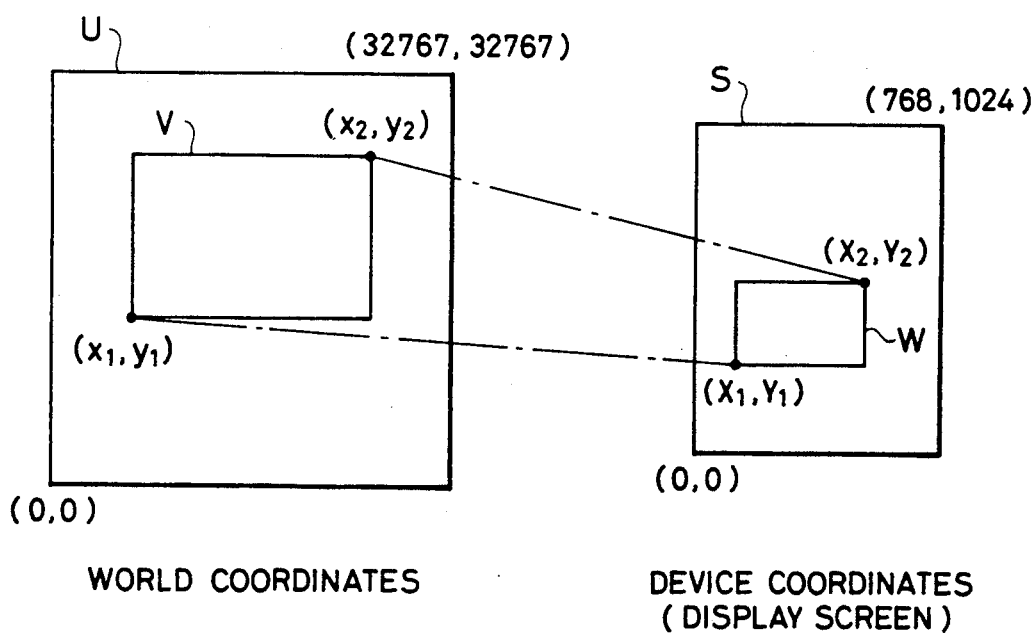
FIG. 3 is an explanatory drawing of the relationship between a world coordinate system and a device coordinate system utilized in a graphic data processing system.

FIG. 3 is a diagram for explaining the coordinate transformation from the world coordinate system to the device coordinate system. In the figure, reference character U denotes world coordinates which are defined by two points (0, 0) and (32767, 32767) on the diagonal and reference character V a window set within the world coordinates, which is defined by two points $(x_1, y_1)$ and $(x_2, y_2)$ on the diagonal. Further, reference character S represents device coordinates which have the coordinate value 768 on the X axis and that 1024 on the Y axis, which absolutely correspond the numbers of pixels on the X and Y axes of the display screen 10, respectively. Within the device coordinates S of the display screen 10, a window W can be designated by two points $(X_1, Y_1)$ and $(X_2, Y_2)$ on the diagonal thereof. If the user designates the two points $(x_1, y_1)$ and $(x_2, y_2)$ on the world coordinate system and the two points $(X_1, Y_1)$ and $(X_2, Y_2)$ on the device coordinate system, the graphic processor 16 carries out the coordinate transformation in accordance with the following formula;

$$P = A \cdot p - B \quad (1)$$

wherein
p : a point in the world coordinates;
P : a point in the device coordinates;

$$A = \begin{bmatrix} \frac{X_2 - X_1}{x_2 - x_1} & 0 \\ 0 & \frac{Y_2 - Y_1}{y_2 - y_1} \end{bmatrix} ; \text{ and}$$

$$B = \begin{bmatrix} X_1 - \frac{X_2 - X_1}{x_2 - x_1} x_1 \\ Y_1 - \frac{Y_2 - Y_1}{y_2 - y_1} y_1 \end{bmatrix}$$

Figure 4:
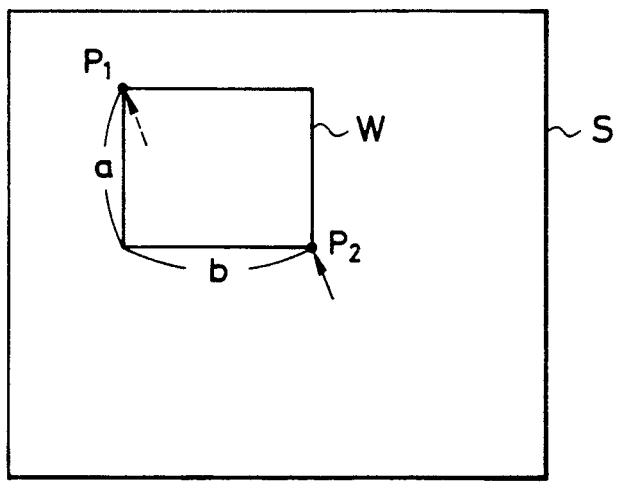
FIG. 4 is a drawing for explaining a method of designating window within a display screen.

Referring next to FIG. 4, the explanation will be made of how to designate a window W on a display screen S by the pointing device 22. In the figure, an arrow represents a graphic cursor. For the simplification, it is assumed that a general drawing of the whole structure of the LSI is always displayed in the window W of the device coordinates S and the window V in the world coordinates U of FIG. 3 is set so as to wholly cover the general drawing. Further, even if the size and location of the window W changes in the device coordinates S (display screen), the window V in the world coordinates U is always fixed.

Under these circumstances, the window W in the device coordinates S can be altered by designating two points $P_1$ and $P_2$ by the cursor (a broken arrow and a solid arrow) which moves on the display screen in accordance with the instruction from the pointing device 22. If a button switch (not shown) of the pointing device 22 is pushed when the cursor is positioned at a desired location on the display screen 10, CPU 12 executes the processing by which the coordinate values are calculated and taken thereinto. In this manner, the user can designate the window at the desired location in the display screen freely.

Upon the completion of designation of the desired window W, CPU 12 calculates the size (a×b) of the window by using the coordinate values taken thereinto and selects the graphic data of the appropriate concept level from among data stored in the disk memory 20 on the basis of the calculated size of the window W. The selected data is displayed within the window W by the aid of the graphic processor 16.

Figure 5:
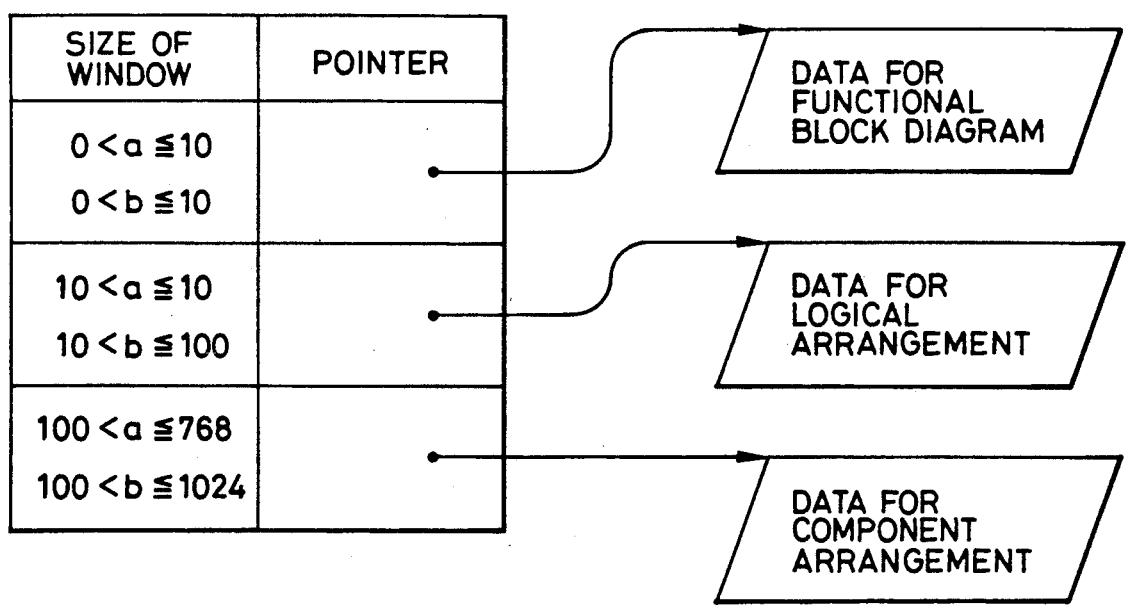
FIG. 5 is an explanatory drawing of a table for determining the concept level of graphic data to be displayed in a designated window in response to the size of the window.

FIG. 5 shows one of examples of a table which represents the relationship of the criteria of the parameters of the window, i.e., the size of the window in the example shown, and pointers. According to this example, the lengths of respective sides of the designated rectangular window, which sides cross with each other at right angle, are compared with the predetermined criteria for judgement, which are set in advance in terms of the number of pixels in the display screen S. Respective sets of the judging criteria of size of the window have particular pointers, any one of which is selected in response to the calculated size of the window. The pointer is an indicator that indicates an entrance address of that location of the disk memory 20 in which graphic data of the corresponding concept level is stored.

In the example shown, if $0 < a \leq 10$ and $0 < b \leq 10$, a pointer, which indicates an address of the location in which there is stored data of the highest concept level, is selected so that data for the functional block diagram is read from the disk memory 20. If $10 < a \leq = 100$ and $10 < b \leq 100$, a pointer, which indicates an address of the location in which there is stored data of the medium concept level, i.e., the data for logical arrangement, is selected. Similarly, when $100 < a \leq 768$ and $100 < b \leq 1024$, a pointer, which indicates an address of the location in which there is stored data of the lowest concept level, is selected so that data for the circuit component arrangement is read out.

Further, the selection of the concept level of data to be displayed can be also executed by the number of pixels covered by the designated window, in place of the lengths of two sides of the window. This may be effective for such a case where a window is designated in the nonrectangular form, for example. Furthermore, the parameter of the window for the selection of the concept level of data to be displayed can be provided by a rate of scale-up and -down in the coordinate transformation of data from the window V in the world coordinates U to the window W in the device coordinates S, as shown in FIG. 3. The judging criteria of this rate of scale-up and -down are set in the direction of the x axis and in the direction of the y axis separately, and the actual rate of scale-up and -down can be obtained on the basis of the values of elements (1, 1) and (2, 2) of a matrix of the coefficient A in the formula (1).

As described above, according to the present invention, graphic data of the appropriate concept level is selected in response to an appropriate parameter of a window designated in a display screen such as the size thereof or the rate of scale-up and -down of graphic data to be displayed in the coordinate transformation, so that the efficiency of the data processing for the display and the easiness to see is much improved.

Although there have been herein shown and described only a few forms of methods embodying the present invention, it is understood that various changes and modifications may be made therein within the scope of the appended claims without departing from the spirit and scope of the preset invention.

We claim:

1. A data display method in a graphic data processing system having a display screen, a storage which stores graphic data, and a pointing device for designating a window of a selected size at a desired position within the display screen, comprising the following steps:
   storing graphic data structured in the hierarchy of plural concept levels in said storage;
   setting plural criteria for judging a parameter of a window within the display screen designated by the pointing device, each of the judging criteria corresponding to a respective one of the concept levels of the graphic data stored in said storage;
   designating a window on a part of the display screen by means of the pointing device;
   judging to what criterion of the parameter the designated window belongs and selecting the graphic data of the concept level corresponding to the criterion of the parameter from among the graphic data stored in the storage; and
   displaying the selected graphic data within the designated window and other graphic data having a concept level different from that of the selected graphic data on the part of the display screen outside said window.

2. A data display method as defined in claim 1, wherein the judging step is performed by referring to a table which represents the relationship of the criteria of the window parameter and pointers, each of which indicates an entrance address of the location of the storage where there is stored the graphic data of the concept level corresponding to the criterion of the parameter of the designated window.

3. A data display method as defined in claim 1, wherein the parameter of the window is the size of the window.

4. A data display method as defined in claim 3, wherein, when the window is designated in the rectangular form, the size of the window is defined on the basis of the lengths of two sides of the rectangular window which cross with each other at a right angle.

5. A data display method as defined in claim 3, wherein the size of the window is defined by the area of the window in terms of the number of pixels in the display screen covered by the area.

6. A data display method as defined in claim 1, wherein the criteria of the parameter of the window are defined on the basis of the rate of scale-up and -down of the graphic data to be displayed within the designated window in the coordinate transformation carried out for display of a the graphic data stored in the storage.

7. A method according to claim 1, wherein said hierarchy of plural concept levels in which the stored graphic data is structured includes a functional block diagram concept level, a logical symbol arrangement concept level and a circuit component arrangement concept level.

8. A data display method in a graphic data processing system having a display screen, a storage which stores graphic data, and a pointing device for designating a window of a given size at a desired position within the display screen, characterized by the following steps:
   storing the graphic data structured in a hierarchy of plural concept levels in the storage;
   setting plural criteria for judging a parameter of the window, each of the judging criteria being made to a correspond to respective one of the concept levels of the graphic data stored in the storage;
   designating a window within the display screen by the pointing device;
   judging to what criterion of the parameter the designated window belongs and selecting the graphic data of the concept level corresponding to the criterion of the parameter, to which the designated window belongs, from among the graphic data stored in the storage; and
   displaying the selected graphic data within the designated window.

9. A method according to claim 8, wherein said hierarchy of plural concept levels in which the stored graphic data is structured includes a functional block diagram concept level, a logical symbol arrangement concept level and a circuit component arrangement concept level.

10. A data display method in a graphic data processing system having a display screen on which predetermined data is displayed, a storage which stores graphic data representing said predetermined data, and a pointing device for designating a window of a selected size at a desired position wherein the display screen, comprising the steps of:
    (a) storing in said storage as said graphic data different concept levels of the same predetermined data as graphic data having a functional block diagram concept level, graphic data having a logical symbol arrangement concept level and graphic data having a circuit component arrangement concept level;
    (b) setting respective ranges of a parameter of a window within the display screen designated by the pointing device for each of the concept levels of graphic data stored in said storage;

(c) designating a window on a part of the display screen by means of the pointing device;

(d) detecting the parameter of the designated window and determining in which of said selected ranges said parameter is included;

(e) reading out of said storage the graphic data whose concept level corresponds to the range determined in step (d); and (f) displaying on the display screen the graphic data which is read out of said storage in step (e) in the window designated in step (c).

11. A data display method as defined in claim 10, wherein said step (f) further includes displaying on the display screen outside of said window graphic data from said storage having a concept level different from the graphic data being displayed within said window.

12. A data display method according to claim 11, wherein the graphic data displayed within said window is a representation of the entirely of said predetermined data and the graphic data displayed outside said window represents a portion of said predetermined data.

13. A data display method according to claim 10, wherein said parameter of the window is the size of the window.

14. A data display method as defined in claim 13, wherein, when the window is designated in the rectangular form, the size of the window is defined on the basis of the lengths of two sides of the rectangular window which cross with each other at a right angle.

15. A data display method as defined in claim 13, wherein the size of the window is defined by the area of the window in terms of the number of pixels in the display screen covered by the area.

* * * * *